US012719370B2

(12) United States Patent
Wang

(10) Patent No.: US 12,719,370 B2
(45) Date of Patent: Aug. 25, 2026

(54) CONTROLLER FOR A BUCK-BOOST CONVERTER

(71) Applicant: Chengdu Monolithic Power Systems Co., Ltd., Chengdu (CN)

(72) Inventor: Rui Wang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 157 days.

(21) Appl. No.: 18/895,088

(22) Filed: Sep. 24, 2024

(65) Prior Publication Data

US 2025/0105744 A1 Mar. 27, 2025

(30) Foreign Application Priority Data

Sep. 25, 2023 (CN) ......................... 202311241141.8

(51) Int. Cl.
*H02M 3/158* (2006.01)
*H02M 3/157* (2006.01)

(52) U.S. Cl.
CPC ......... *H02M 3/1582* (2013.01); *H02M 3/157* (2013.01)

(58) Field of Classification Search
CPC ............................ H02M 3/1582; H02M 3/157
See application file for complete search history.

(56) References Cited

U.S. PATENT DOCUMENTS 9,041,363 B2 * 5/2015 Tanabe ................ H02M 3/1582 323/259
10,250,142 B1 * 4/2019 Yang .................. H02M 3/1582
10,404,173 B1 * 9/2019 de Cremoux ......... H02M 3/157
10,594,218 B1 * 3/2020 Zhan ......................... G05F 1/62
10,992,231 B1 * 4/2021 Yang ................... H02M 1/0025
11,418,119 B2 * 8/2022 Xie ..................... H02M 3/1582
11,552,555 B2 * 1/2023 Ranmuthu ............ H02M 3/157
2006/0176036 A1 * 8/2006 Flatness ............. H02M 3/1582 323/282
2008/0088284 A1 * 4/2008 Weng ................. H02M 3/1563 323/271
2011/0057637 A1 * 3/2011 Liu ....................... H02M 3/156 323/287
2011/0068761 A1 * 3/2011 Chen .................. H05B 45/3725 323/282
2011/0156685 A1 * 6/2011 Chen .................. H02M 3/1582 323/284
2012/0319669 A1 * 12/2012 Chen .................. H02M 3/1582 323/283
2015/0069958 A1 * 3/2015 Yang ......................... H02J 7/90 320/137

(Continued)

*Primary Examiner* — Yusef A Ahmed

(74) *Attorney, Agent, or Firm* — Ashurst Perkins Coie US LLP

(57) ABSTRACT

The present application relates to a controller for a BUCK-BOOST converter. The controller is configured to convert an input voltage to an output voltage. The controller controls the BUCK-BOOST converter to operate in a BUCK mode, a frequency-reduced BUCK mode, a BUCK-BOOST mode, a frequency-reduced BOOST mode and a BOOST mode in sequence as the input voltage decreases; or, the controller controls the BUCK-BOOST converter to operate in a BOOST mode, a frequency-reduced BOOST mode, a BUCK-BOOST mode, a frequency-reduced BUCK mode and a BUCK mode in sequence as the input voltage increases.

30 Claims, 8 Drawing Sheets

(56) References Cited

U.S. PATENT DOCUMENTS

| | | | | |
|---|---|---|---|---|
| 2015/0381039 | A1* | 12/2015 | Hari | H02M 1/15<br>323/271 |
| 2016/0181920 | A1* | 6/2016 | Dai | H02M 1/14<br>323/271 |
| 2016/0315535 | A1* | 10/2016 | Ouyang | H02M 3/1582 |
| 2016/0352228 | A1* | 12/2016 | Zhang | H02M 1/32 |
| 2016/0365790 | A1* | 12/2016 | Ye | H02M 3/1582 |
| 2017/0201178 | A1* | 7/2017 | Cheng | H02M 3/1582 |
| 2017/0346400 | A1* | 11/2017 | Li | H02M 3/1582 |
| 2018/0041126 | A1* | 2/2018 | Zhang | H02M 3/1582 |
| 2018/0337601 | A1* | 11/2018 | Vadnerkar | H02M 3/158 |
| 2018/0358900 | A1* | 12/2018 | Sun | H02M 3/1582 |
| 2019/0305666 | A1* | 10/2019 | Yang | H02M 1/0009 |
| 2020/0161977 | A1* | 5/2020 | Yang | H02M 3/157 |
| 2020/0373841 | A1* | 11/2020 | Xie | H02M 3/1582 |
| 2021/0184577 | A1* | 6/2021 | Yang | H02M 1/0003 |
| 2021/0359605 | A1* | 11/2021 | Yang | H02M 1/08 |
| 2022/0045613 | A1* | 2/2022 | Chen | H02M 1/0003 |
| 2022/0149737 | A1* | 5/2022 | Yang | H02M 1/08 |
| 2022/0200455 | A1* | 6/2022 | Zhang | H02M 1/0025 |
| 2022/0345043 | A1* | 10/2022 | Krugly | H02M 1/0025 |
| 2023/0198404 | A1* | 6/2023 | Cheng | H02M 3/1582<br>323/271 |
| 2024/0204666 | A1* | 6/2024 | Lee | H02M 1/0009 |
| 2025/0350209 | A1* | 11/2025 | Yen | H02M 3/1582 |

* cited by examiner

CONTROLLER FOR A BUCK-BOOST CONVERTER

CROSS-REFERENCE TO RELATED APPLICATIONS

This application claims the benefit of CN application No. 202311241141.8 filed on Sep. 25, 2023, and incorporated herein by reference.

TECHNICAL FIELD

Embodiments of the present invention generally relates to electronic circuits, and more particularly but not exclusively, to a controller for driving a BUCK-BOOST converter.

BACKGROUND OF THE INVENTION

Power converters are essential parts in electronic systems. Depending on a relative magnitude of an input voltage to an output voltage, a buck converter, a boost converter, or a BUCK-BOOST converter can be selected to realize voltage conversion. In some applications, the input voltage may change with load conditions, operating hours, etc., causing the relative magnitude of the input voltage and the output voltage to change from time to time. BUCK-BOOST converters could be a good choice for converting a varying input voltage to a relatively constant output voltage.

A typical BUCK-BOOST converter includes a four-switch BUCK-BOOST topology, which can be derived from a dual-switch BUCK-BOOST topology by replacing two diodes of the dual-switch BUCK-BOOST topology with two switches. By using various combinations of ON operation and OFF operation of the four switches for energy conversion, the input voltage may be converted into the output voltage. When the input voltage is much higher than the output voltage, the four-switch Buck-Boost converter operates in a Buck mode to achieve voltage step-down. When the input voltage is much lower than the output voltage, the four-switch Buck-Boost converter operates in a Boost mode to achieve voltage step-up. If the input voltage is close to the output voltage, the four-switch Buck-Boost converter operates in a Buck-Boost mode. The Buck-Boost mode is an intermediate mode between the Buck mode and the Boost mode, which can avoid pulse skipping and a series of problems that come with the direct transition from the Buck mode to the Boost mode.

Many control methods can be employed to control the four-switch Buck-Boost converter, such as Pulse Width Modulation (PWM) voltage mode, PWM peak current mode, and Constant Turned-on time (COT) mode. To ensure a stable output voltage under different input conditions and to minimize losses and improve efficiency, various optimizations can be proposed for the four-switch Buck-Boost converter with different control methods.

SUMMARY OF THE INVENTION

The present application provides a controller for a BUCK-BOOST converter. The controller is configured to convert an input voltage to an output voltage. The controller controls the BUCK-BOOST converter to operate in a BUCK mode, a frequency-reduced BUCK mode, a BUCK-BOOST mode, a frequency-reduced BOOST mode and a BOOST mode in sequence as the input voltage decreases; or, the controller controls the BUCK-BOOST converter to operate in a BOOST mode, a frequency-reduced BOOST mode, a BUCK-BOOST mode, a frequency-reduced BUCK mode and a BUCK mode in sequence as the input voltage increases.

According to an embodiment of the present application, the controller includes a mode selection circuit. The mode selection circuit is configured to compare a first off time monitoring signal that is indicative of an off time of a first power switch with a first off time threshold, and compare a first on time monitoring signal that is indicative of an on time of the first power switch with a first on time threshold. When the first off time monitoring signal reaches the first off time threshold, the controller controls the BUCK-BOOST converter to operate in a frequency-reduced BUCK mode, and when the first on time monitoring signal reaches the first on time threshold, the controller controls the BUCK-BOOST converter to operate in a BUCK-BOOST mode.

According to an embodiment of the present application, the controller includes a mode selection circuit. The mode selection circuit is configured to compare a second on time monitoring signal that is indicative of an on time of a third power switch with a second on time threshold, and compare a second off time monitoring signal that is indicative of an off time of the third power switch with a second off time threshold. When the second on time monitoring signal reaches the second on time threshold, the controller controls the BUCK-BOOST converter to operate in a frequency-reduced BOOST mode, and when the second off time monitoring signal reaches the second off time threshold, the controller controls the BUCK-BOOST converter to operate in a BUCK-BOOST mode.

BRIEF DESCRIPTION OF DRAWINGS

For a better understanding of the present application, embodiments of the invention will be described in accordance with the following drawings, which are used for illustrative purpose only. The drawings illustrate only some of the features in an embodiment. It should be understood that the drawings are not necessarily to scale. Like elements are provided with like reference numerals in different appended drawings.

DETAILED DESCRIPTION OF THE INVENTION

Detailed description of the embodiments is provided merely to give examples and not intended to be limiting. Plenty of details are provided to assist the reader in gaining a comprehensive understanding of the present invention. However, many other ways of implementing the disclosure of the present application described herein will be apparent. Description of materials and methods that are known in the art may not be addressed in the present application for simplicity.

Throughout the specification and claims, the phrases "in one embodiment", "in some embodiments", "in one implementation", and "in some implementations" as used includes both combinations and sub-combinations of various features described herein as well as variations and modifications thereof. These phrases used herein do not necessarily refer to the same embodiment, although it may. Those skilled in the art should understand that the meanings of the terms identified above do not necessarily limit the terms, but merely provide illustrative examples for the terms. It is noted that when an element is "connected to" or "coupled to" the other element, it means that the element is directly connected to or coupled to the other element, or indirectly connected to or coupled to the other element via another element. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
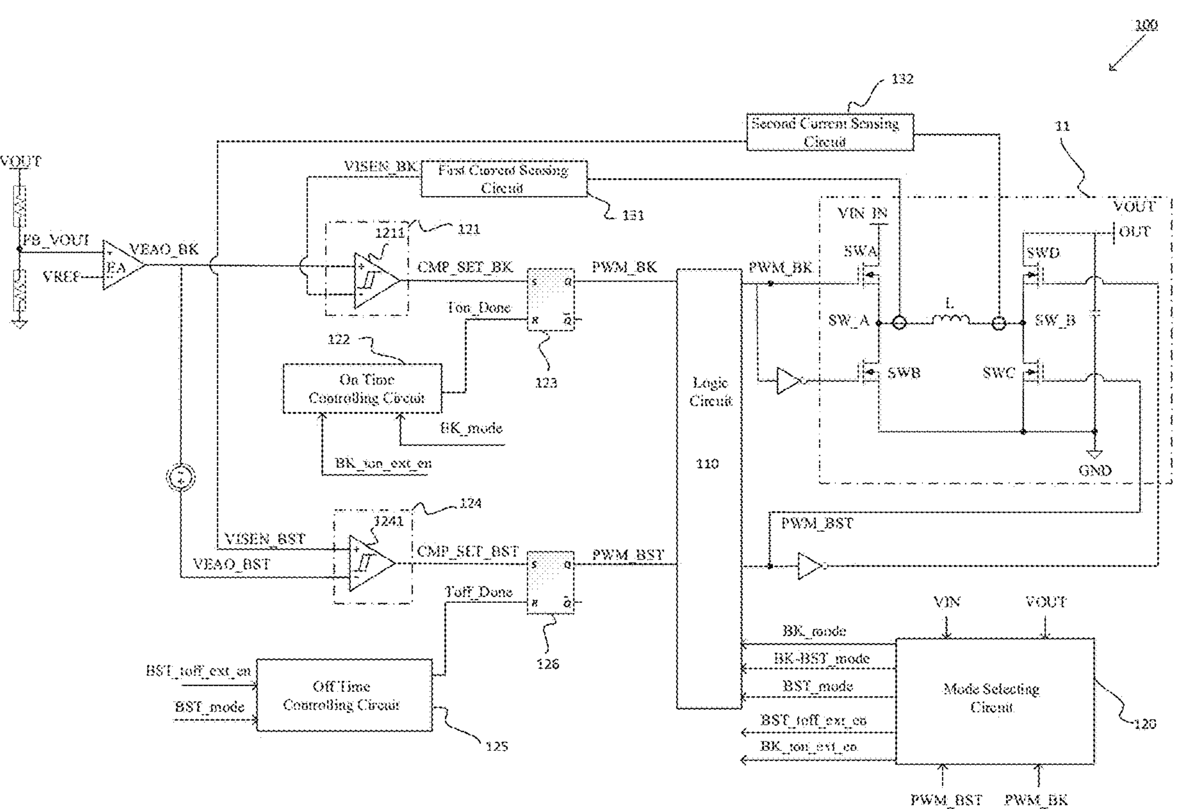
FIG. 1 is a schematic diagram of a circuit architecture of a BUCK-BOOST switching power converter 100, according to an embodiment of the present application.

FIG. 1 is a schematic diagram of a circuit architecture of a BUCK-BOOST switching power converter 100, according to an embodiment of the present application. The BUCK-BOOST switching power converter 100 includes a switching circuit 11 and a controlling circuit. The switching circuit 11 includes an input terminal IN for receiving an input voltage VIN, an output terminal OUT for providing an output voltage VOUT, a reference ground terminal GND, and a switching unit. The switching unit includes a first power switch SWA, a second power switch SWB, a third power switch SWC and a fourth power switch SWD. The first power switch SWA and the second power switch SWB are coupled in series between the input terminal IN and the reference ground GND. A common coupling node of the first power switch SWA and the second power switch SWB forms a first power switching node SW_A. The third power switch SWC and the fourth power switch SWD are coupled in series between the output terminal OUT and the reference ground GND. A common coupling node of the third power switch SWC and the fourth power switch SWD forms a second switching node SW_B. An inductive element L is coupled between the first power switching node SW_A and the second switching node SW_B. Each of the four power switches SWA, SWB, SWC, and SWD could include a controllable switch, including but not limited to a MOSFET as shown in FIG. 1. These four switches SWA, SWB, SWC, and SWD of the switching unit are configured to be turned ON and OFF based on controlling signals (e.g., PWM_BK and PWM_BST in FIG. 1) to convert the input voltage VIN into the output voltage VOUT.

The controlling circuit is configured to control the switching circuit 11, so that the BUCK-BOOST switching power converter 100 can experience a frequency-reduced BUCK mode when transitioning from a BUCK mode to a BUCK-BOOST mode, and/or experience a frequency-reduced BOOST mode when transitioning from a BOOST mode to the BUCK-BOOST mode.

In an embodiment, the controlling circuit includes a mode selecting circuit 120. Signals input into the mode selecting circuit 120 are used to determine operation modes of the BUCK-BOOST switching power converter 100. The signals input into the mode selecting circuit 120 may be selected from a group of signals including for example the input voltage VIN, the output voltage VOUT, a ratio of the input voltage VIN to the output voltage VOUT, and controlling signals (e.g., PWM_BK and PWM_BST shown in FIG. 1) of the switching unit. The following will illustrate examples of a control logic of the mode selecting circuit 120 and some possible implementations of other elements of the controlling circuit.

When the ratio of the input voltage VIN to the output voltage VOUT is greater than a first threshold VTH1 (in an exemplary embodiment, VTH1=1.2), the mode selecting circuit 120 outputs a BUCK mode enabling signal BK_mode in a first state (for example, logic high), instructing the BUCK-BOOST switching power converter 100 to operate in the BUCK mode.

The BUCK mode enabling signal BK_mode, which is in the first state (for example, logic high), is logically operated with a first pulse width modulation signal PWM_BK, which is applicable for controlling the first power switch SWA and the second power switch SWB. The result of this logical operation is used to control the switching unit to operate in the BUCK mode. In one embodiment, the controlling circuit may generate the first pulse width modulation signal PWM_BK based on the input voltage VIN, the output voltage VOUT, an output voltage feedback signal FB_VOUT, a reference voltage VREF, and a first current sampling signal VISEN_BK that is indicative of a current flowing through the inductive element L in the BUCK mode.

The controlling circuit includes a first output regulating circuit 121, an on time controlling circuit 122, and a first logic circuit 123. In one embodiment, the first logic circuit 123 is an RS flip-flop, which is configured to generate the first pulse width modulation signal PWM_BK. A set terminal S of the first logic circuit 123 is coupled to an output terminal of the first output regulating circuit 121, and a reset terminal R of the first logic circuit 123 is coupled to an output terminal of the on time controlling circuit 122.

As shown in FIG. 1, in one embodiment, the first output regulating circuit 121 includes a comparison circuit 1211. The comparison circuit 1211 has a first input terminal, a second input terminal, and an output terminal. The first input terminal is coupled to a first current sensing circuit 131 to receive the first current sampling signal VISEN_BK that is indicative of the current flowing through the inductive element L, the second input terminal receives a first error amplifying signal VEAO_BK, and the output terminal provides a first output regulating signal CMP_SET_BK. When the first current sampling signal VISEN_BK decreases to the first error amplifying signal VEAO_BK, the first output regulating signal CMP_SET_BK transits to the first state (for example, logic high) to set the first logic circuit 123.

The on time controlling circuit 122 is configured to generate an on time controlling signal Ton_Done. The on time controlling signal Ton_Done, when in the first state, can reset the first logic circuit 123.

Figure 2:
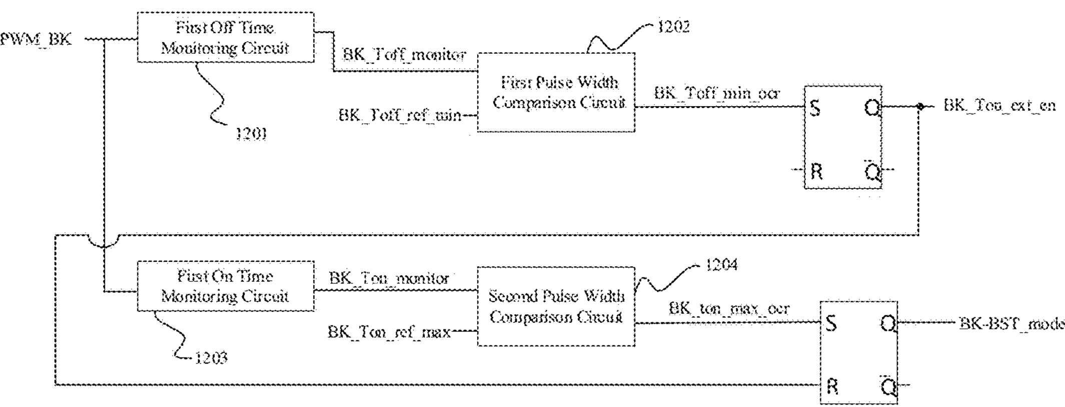
FIG. 2 is a schematic diagram of the mode selecting circuit, according to an embodiment of the present application.

When the ratio of the input voltage VIN to the output voltage VOUT gradually decreases to VTH1, the controlling circuit may be configured to obtain key information carried in the first pulse width modulation signal PWM_BK to determine whether the current operation mode is still appropriate. Referring to FIG. 2, in one embodiment, the mode selecting circuit 120 includes a first off time monitoring circuit 1201 and a first pulse width comparison circuit 1202. The first off time monitoring circuit 1201 samples the first pulse width modulation signal PWM_BK and generates a first off time monitoring signal BK_Toff_monitor that is indicative of an off time of the first power switch SWA. The first pulse width comparison circuit 1202 receives the first off time monitoring signal BK_Toff_monitor and compares it with a first off time threshold BK_Toff_ref_min. In one embodiment, the first off time threshold BK_Toff_ref_min could be preset based on a minimum off time allowed for the BUCK mode of the power converter 100. When the first off time monitoring signal BK_Toff_monitor decreases to the first off time threshold BK_Toff_ref_min, the first pulse width comparison circuit 1202 outputs a first indication signal BK_Toff_min_ocr which is in the first state. The first indication signal BK_Toff_min_ocr which is in the first state, could set the RS flip-flop in FIG. 2, thereby triggering the mode selecting circuit 120 to output an on time extension signal BK_ton_ext_en which is in the first state (for example, logic high), which will enable the BUCK-BOOST switching power converter 100 to enter the frequency-reduced BUCK mode.

In one embodiment, the on time extension signal BK_ton_ext_en in the first state could be logically operated with the first pulse width modulation signal PWM_BK to control the switching unit to operate in the frequency-reduced BUCK mode. In another embodiment, although the on time extension signal BK_ton_ext_en in the first state is generated, it is not utilized or involved in the mode selection. The BUCK mode enabling signal BK_mode, which is still in the first state (for example, logic high), continues to be logically operated with the first pulse width modulation signal PWM_BK to control the switching unit to operate in the frequency-reduced BUCK mode.

Figure 3:
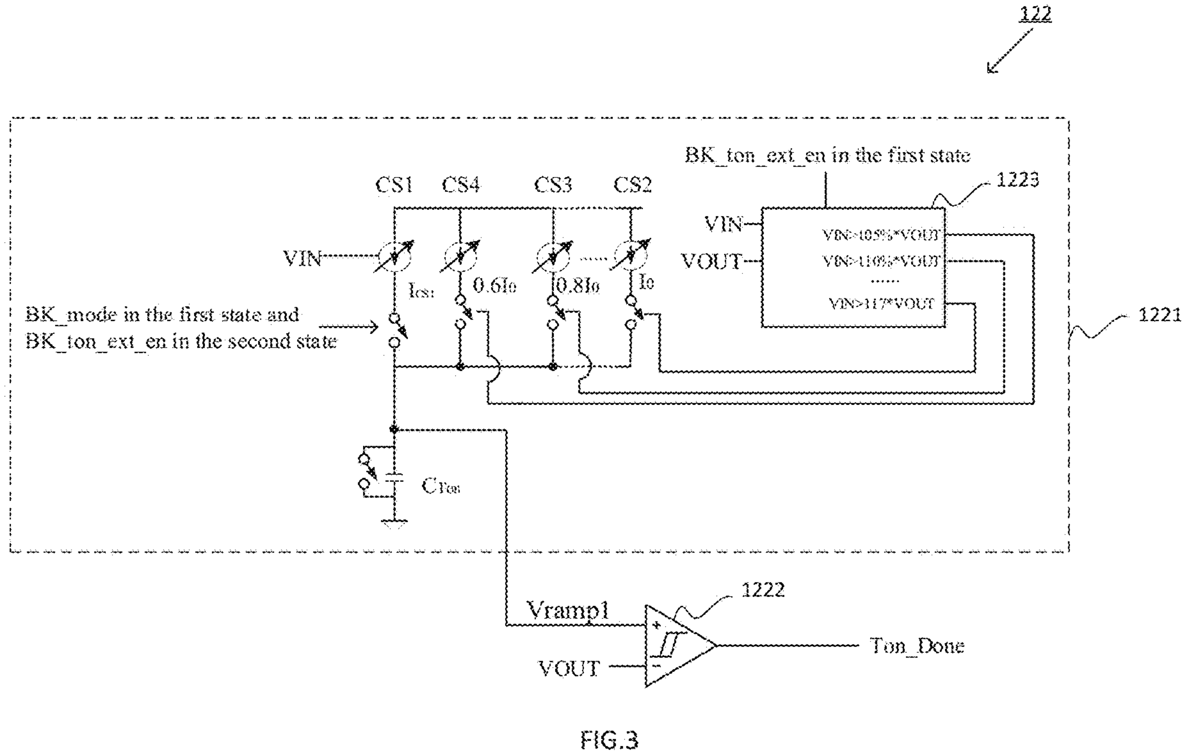
FIG. 3 is a schematic diagram of the on time controlling circuit, according to an embodiment of the present application.
Figure 4:
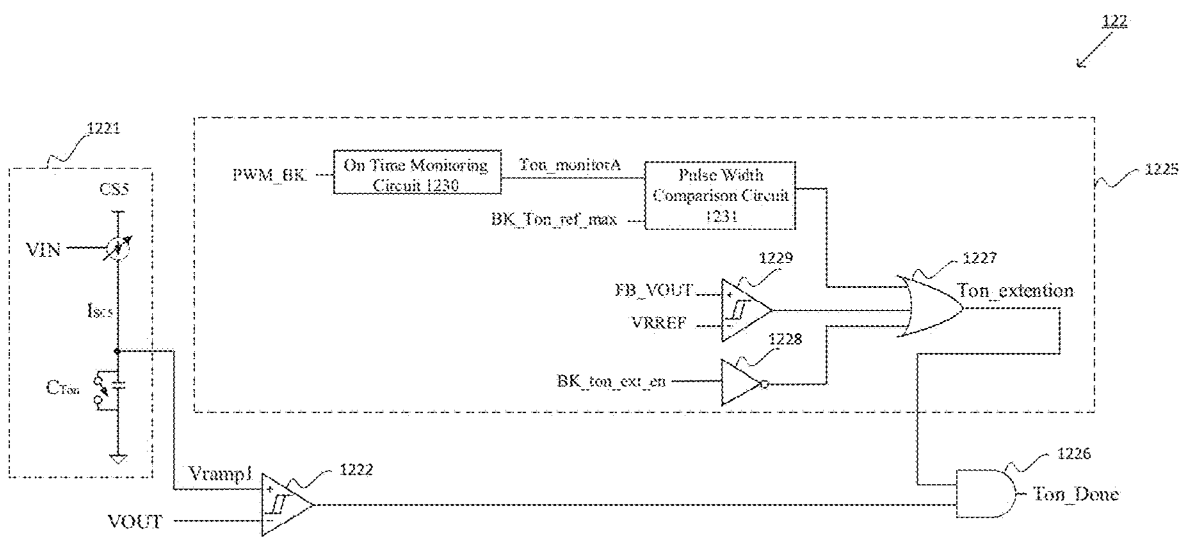
FIG. 4 is a schematic diagram of the on time controlling circuit, according to another embodiment of the present application.
Figure 5:
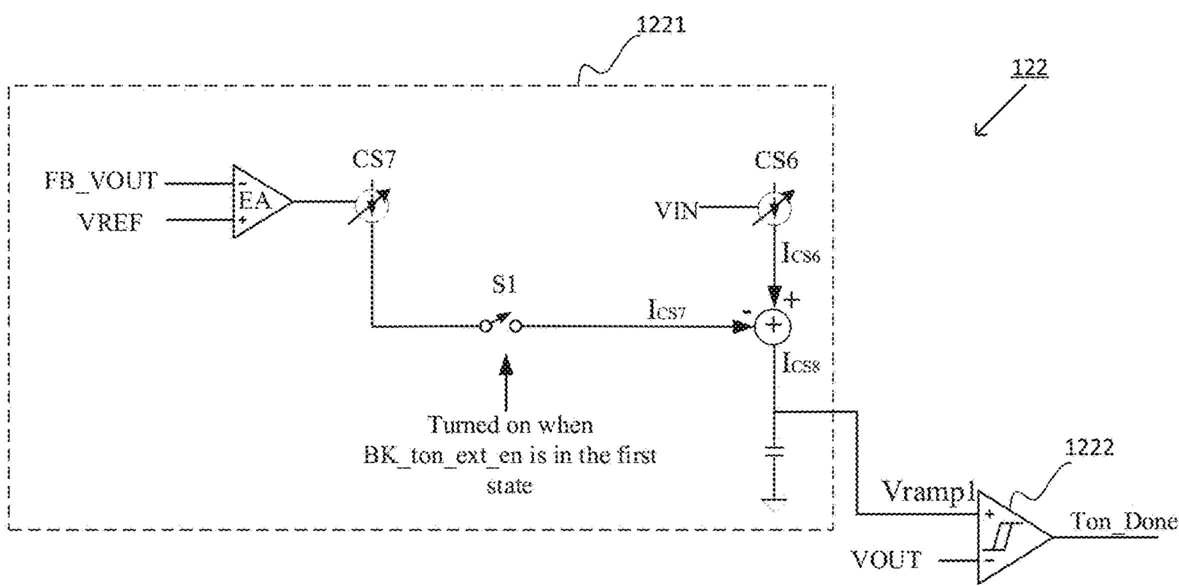
FIG. 5 is a schematic diagram of the on time controlling circuit, according to yet another an embodiment of the present application.

In the present application, mode switching does not necessarily rely on inputting the on time extension signal BK_ton_ext_en in the first state to the logic circuit 110 and performing logical operation on it. The mode switching between the BUCK mode and the frequency-reduced BUCK mode could be achieved by involving the on time extension signal BK_ton_ext_en in the generation process of the first pulse width modulation signal PWM_BK. When the on time extension signal BK_ton_ext_en is in the first state, the controlling circuit generates the first pulse width modulation signal PWM_BK based on a frequency-reduced BUCK mechanism, ensuring that the on time of the first power switch SWA in the frequency-reduced BUCK mode is always longer than the on time of the first power switch SWA in the BUCK mode. FIGS. 3-5 provide some possible implementations.

FIG. 3 is a schematic diagram of the on time controlling circuit 122, according to an embodiment of the present application. The on time controlling circuit 122 includes a ramp signal generating circuit 1221, a comparison circuit 1222 and a current source selection module 1223. The ramp signal generating circuit 1221 in an example includes current sources CS1, CS2, CS3, CS4, and a capacitor $C_{Ton}$. A voltage across the capacitor $C_{Ton}$ is used to provide a first ramp signal Vramp1. The current sources CS1, CS2, CS3, CS4 are configured to provide charging currents with different magnitudes to the capacitor $C_{Ton}$, such as $I_{CS1}$, $I_0$, etc., as illustrated in FIG. 3. The on time extension signal BK_ton_ext_en and the BUCK mode enabling signal BK_mode could affect selection of the current sources CS1, CS2, CS3, CS4. For example, when the BUCK mode enabling signal BK_mode is in the first state (for example, logic high) and the on time extension signal BK_ton_ext_en is in a second state (for example, logic low), the current source CS1 controlled by the input voltage VIN would be selected and provides a charging current $I_{CS1}$ to charge the capacitor $C_{Ton}$. The charging current $I_{CS1}$ varies in a same direction as the input voltage VIN, that is, it decreases as the input voltage VIN decreases and increases as the input voltage VIN increases. When the on time extension signal BK_ton_ext_en is in the first state, the current source selection module 1223 may continuously compare and calculate the input voltage VIN and the output voltage VOUT, and switches between the current sources CS2, CS3, and CS4 based on the comparting/calculation results. As the input voltage VIN gradually approaches the output voltage VOUT, a current source that provides a smaller charging current is selected to charge the capacitor $C_{Ton}$. For example, when the ratio of the input voltage VIN to the output voltage VOUT is greater than 117%, the current source CS2 is activated to provide a current $I_0$ to charge the capacitor $C_{Ton}$. When the ratio of the input voltage VIN to the output voltage VOUT is greater than 110% and smaller than 117%, the current source CS3 is activated to provide a current that is 0.8 times of the current $I_0$. When the ratio of the input voltage VIN to the output voltage VOUT is greater than 105% and smaller than 110%, the current source CS4 is activated to provide a current that is 0.6 times the current $I_0$. The current $I_0$ is smaller than the current $I_{CS1}$ produced by the current source CS1. The comparison circuit 1222 includes a first input terminal coupled to an output terminal of the ramp signal generating circuit 1221 to receive the first ramp signal Vramp1, a second input terminal configured to receive the output voltage VOUT, and an output terminal configured to provide the on time controlling signal Ton_Done.

In the embodiment illustrated in FIG. 3, the on time extension signal BK_ton_ext_en, when is in the first state, can influence the generation of the first ramp signal Vramp1 of the on time controlling circuit 122. By directing one of the current sources CS2, CS3, and CS4 to charge the capacitor $C_{Ton}$, the first ramp signal Vramp1 ramps to the output voltage VOUT with a reduced slope, thereby extending a duration for the on time controlling signal Ton_Done to transition to the first state (for example, logic high), and thus providing an extended on time of the first power switch SWA. As the ratio of the input voltage VIN to the output voltage VOUT decreases, the on time of the first power switch SWA gradually increases. As such, when the on time extension signal BK_ton_ext_en is in the first state, the controlling circuit generates the first pulse width modulation signal PWM_BK with an on time frequency-reduced BUCK mechanism, thereby enabling the BUCK-BOOST switching power converter 100 to operate in the frequency-reduced BUCK mode.

FIG. 4 is another embodiment of the on time controlling circuit 122, according to an embodiment of the present application. The on time controlling circuit 122 includes a ramp signal generating circuit 1221, a comparison circuit 1222, a delay circuit 1225 and a logical AND circuit 1226. The ramp signal generating circuit 1221 includes a current source CS5 controlled by the input voltage VIN. A current $I_{CS5}$ provided by the current source CS5 changes in a same direction as the input voltage VIN, that is, it decreases as the input voltage VIN decreases and increases as the voltage VIN increases. This current $I_{CS5}$ is used to charge the capacitor $C_{Ton}$, and a voltage across the capacitor $C_{Ton}$ provides a first ramp signal Vramp1. The comparison circuit 1222 includes a first input terminal, a second input terminal and an output terminal, where the first input terminal is coupled to an output terminal of the ramp signal generating circuit 1221, to receive the first ramp signal Vramp1, and the second input terminal receives the output voltage VOUT. When the first ramp signal Vramp1 is greater than the output voltage VOUT, a signal at an output terminal of the comparison circuit 1222 is inverted to the first state (e.g., logic high). The logical AND circuit 1226 includes a first input terminal, a second input terminal and an output terminal, where the first input terminal is coupled to the output terminal of the comparison circuit 1222, the second input terminal is coupled to an output terminal of the delay circuit 1225, and the output terminal provides the on time controlling signal Ton_Done. As shown in FIG. 4, in one embodiment, the delay circuit 1225 includes a logical OR circuit 1227, an inverter 1228 and a voltage comparator 1229. The inverter 1228 inverts the input on time extension signal BK_ton_ext_en, and the voltage comparator 1229 compares the output voltage feedback signal FB_VOUT with the reference voltage VREF.

When the on time extension signal BK_ton_ext_en is in the second state (e.g., logic low), a delay signal Ton_extention output by the delay circuit 1225 is in the first state (e.g., logic high), and a timing when the on time controlling signal Ton_Done is turned to the first state (e.g., logic high) is determined by an output of the comparison circuit 1222. When the on time extension signal BK_ton_ext_en is in the first state (e.g., logic high), an output of the voltage comparator 1229 may affect the delay signal Ton_extention. In one embodiment, the voltage comparator 1229 shown in FIG. 4 compares the output voltage feedback signal FB_VOUT with the reference voltage VREF. If the output voltage feedback signal FB_VOUT is smaller than the reference voltage VREF, it means that the energy currently provided is insufficient, and it is necessary to extend the on time of the first power switch SWA, and a signal output by the voltage comparator 1229 is in the second state (e.g., logic low). Until the output voltage feedback signal FB_VOUT is greater than the reference voltage VREF, which indicates that the currently supplied energy is sufficient, the first power switch SWA can be turned off, the signal output by the voltage comparator 1229 is changed to the first state (e.g., logic high), and the delay signal Ton_extention output by the delay circuit 1225 is changed to the first state (e.g., logic high), so that the on time controlling signal Ton_Done is also changed to the first state (e.g., logic high). In this embodiment, when the on time extension signal BK_ton_ext_en is in the first state, the timing when the on time controlling signal Ton_done jumps to the first state needs to be determined in combination with the feedback voltage. As long as the output energy is insufficient, the on time will be extended. As such, when the on time extension signal BK_ton_ext_en is in the first state, the BUCK-BOOST switching power converter 100 operates in the frequency-reduced BUCK mode.

In some examples, the delay circuit 1225 further includes an on time monitoring circuit 1203A and a pulse width comparison circuit 1202A for controlling the maximum on time. The on time monitoring circuit 1203A samples the first pulse width modulation signal PWM_BK and provides a time monitoring signal Ton_monitorA, and the pulse width comparison circuit 1202A compares the time monitoring signal Ton_monitorA with a first on time threshold BK_Ton_ref_max. When the time monitoring signal Ton_monitorA indicating the on time of the first power switch SWA increases to the first on time threshold BK_Ton_ref_max, the delay signal Ton_extention is inverted to the first state (e.g., logic high), so that the on time controlling signal Ton_Done is also inverted to the first state (e.g., logic high). In other examples, an output signal of the second pulse width comparison circuit 1204 shown in FIG. 2 can be input to the logical AND circuit 1226 to control the maximum on time.

FIG. 5 is another embodiment of the on time controlling circuit 122, according to an embodiment of the present application. The on time controlling circuit 122 includes a ramp signal generating circuit 1221 and a comparison circuit 1222. The ramp signal generating circuit 1221 includes a current source CS6 controlled by the input voltage VIN. A current $I_{CS6}$ provided by the current source CS6 changes in a same direction as the input voltage VIN, that is, it decreases as the input voltage VIN decreases and increases as the input voltage VIN increases. The ramp signal generating circuit 1221 further includes a current source CS7 controlled by an output voltage of an error amplifier EA, and a current $I_{CS7}$ provided by the current source CS7 changes in a same direction as the output voltage of the error amplifier EA, that is, it decreases as the output voltage of the error amplifier EA decreases and increases as the output voltage of the error amplifier EA increases. The input terminals of the error amplifier EA receive the output voltage feedback signal FB_VOUT and the reference voltage VREF respectively. When the on time extension signal BK_ton_ext_en is in the second state (for example, logic low), the first power switch SWA is not turned on, and the current $I_{CS6}$ is used to charge the capacitor $C_{Ton}$ (at this time, $I_{CS8}=I_{CS6}$), and a voltage across the capacitor $C_{Ton}$ provides a first ramp signal Vramp1. When the on time extension signal BK_ton_ext_en is in the first state (for example, logic high), the first power switch SWA is turned on, and a subtracter performs subtraction operation on the current $I_{CS5}$ and the current $I_{CS7}$, and then uses the subtracted current to charge the capacitor $C_{Ton}$ (at this time, $I_{CS5}=I_{CS6}-I_{CS7}$). The comparison circuit 1222 includes a first input terminal, a second input terminal and an output terminal, where the first input terminal is coupled to an output terminal of the ramp signal generating circuit 1221 to receive the first ramp signal Vramp1, and the second input terminal receives the output voltage VOUT. When the first ramp signal Vramp1 is greater than the output voltage VOUT, the comparison circuit 1222 outputs the on time controlling signal Ton_Done in the first state (e.g., logic high). In this embodiment, when the output energy is insufficient, the current source CS7 can provide a linearly controlled current $I_{CS7}$, and the on time is extended accordingly. As such, when the on time extension signal BK_ton_ext_en is in the first state, the BUCK-BOOST switching power converter 100 operates in the frequency-reduced BUCK mode.

Referring to FIG. 2, the mode selection circuit 120 further includes a first on time monitoring circuit 1203 and a second pulse width comparison circuit 1204. The second pulse width comparison circuit 1204 receives the first on time monitoring signal BK_Ton_monitor that is indicative of the on time of the first power switch SWA provided by the first on time monitoring circuit 1203 and compares it with the first on time threshold BK_Ton_ref_max. In the foregoing exemplary embodiment, in the frequency-reduced BUCK mode, as the ratio of the input voltage VIN to the output voltage VOUT continues to decrease, the on time gradually increases. When the first on time monitoring signal BK_Ton_monitor that is indicative of the on time increases to the first on time threshold BK_Ton_ref_max, the second pulse width comparison circuit 1204 outputs a second indication signal BK_Ton_max_ocr in the first state. In one embodiment, the second indication signal BK_Ton_max_ocr in the first state can set the RS flip-flop, so that the mode selection circuit 120 outputs a BK-BST_mode signal in the first state (e.g., logic high), thereby controlling the BUCK-BOOST switching power converter 100 to switch from the frequency-reduced BUCK mode to the BUCK-BOOST mode.

From the above disclosures, it can be seen that in the control method of the present application, with the decrease of the ratio of the input voltage VIN to the output voltage VOUT, the controlling circuit is configured to delay the switching unit to enter the BUCK-BOOST mode as much as possible. Determining whether the current operation mode of the switching unit is appropriate with the information carried in the first pulse width modulation signal PWM_BK (for example, the off time and the on time of the first power switch SWA). The frequency-reduced BUCK mode is still a BUCK mode in essence, but compared with the BUCK mode described in the present application, it has a longer on time and a lower frequency. A start condition of the frequency-reduced BUCK mode is that the first off time monitoring signal BK_Toff_monitor reaches the first off time threshold BK_Toff_ref_min, and an end condition of the frequency-reduced BUCK mode is that the first on time monitoring signal BK_Ton_monitor that is indicative of the on time of the first power switch SWA increases to the first on time threshold BK_Ton_ref_max (that is, the preset maximum on time). In one embodiment, the mode switching may be performed when the above time monitoring signal reach their corresponding thresholds for the first time, and in other embodiments, the mode switching may be performed when the time monitoring signals reach their corresponding thresholds for many times.

A condition of entering the BUCK-BOOST mode is that the on time of the first power switch SWA has reached the preset maximum on time. When this condition is met, it indicates that the BUCK-BOOST switching power converter 100 will not be able to provide enough energy at the output terminal if the BUCK-BOOST switching power converter 100 continues to operate in the frequency-reduced BUCK mode, so it is appropriate for the BUCK-BOOST switching power converter 100 to switch to the BUCK-BOOST mode.

Figure 6A:
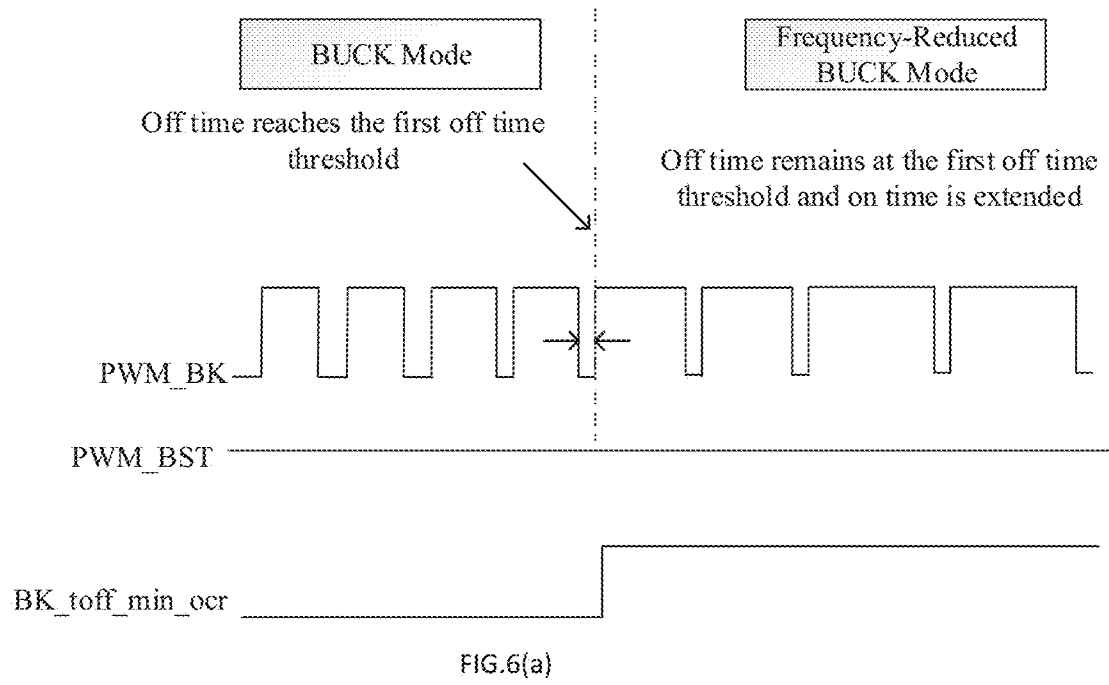
FIG. 6(*a*) and FIG. 6(*b*) are schematic waveform diagrams of some signals in a BUCK-BOOST switching power converter in different modes controlled by the controlling circuit, according to an embodiment of the present application.
Figure 6B:
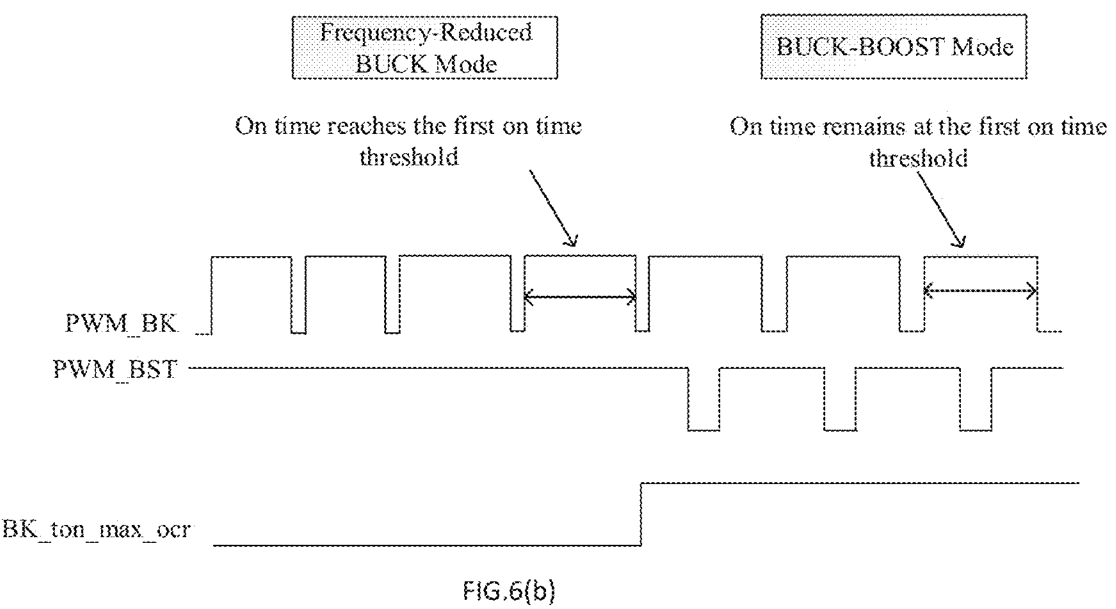

FIG. 6(*a*) and FIG. 6(*b*) are schematic waveform diagrams of some signals in a BUCK-BOOST switching power converter 100 in different modes, according to an embodiment of the present application. As shown in FIG. 6(*a*), at a critical point before entering the frequency-reduced BUCK mode, the off time of the first power switch SWA has reached a first off time threshold BK_Toff_ref_min, and the first indication signal BK_Toff_min_ocr is inverted to the first state (e.g., logic high). After entering the frequency-reduced BUCK mode, the off time of the first pulse width modulation signal PWM_BK remains unchanged, and the on time is extended. As shown in FIG. 6(*b*), at a critical point before entering the BUCK-BOOST mode, the on time of the first pulse width modulation signal PWM_BK has reached the first on time threshold BK_Ton_ref_max, and the second indication signal BK_Ton_max_ocr is inverted to the first state (e.g., logic high). In one embodiment of the present application, after entering the BUCK-BOOST mode, the on time of the first pulse width modulation signal PWM_BK is maintained as the first on time threshold BK_Ton_ref_max. In this way, when the BUCK-BOOST switching power converter 100 is switched from the frequency-reduced BUCK mode to the BUCK-BOOST mode, the on time of the first power switch SWA remains unchanged, and the change of the switching frequency of the first power switch SWA is effectively controlled. As such, the BUCK-BOOST switching power converter 100 described in the present application realizes seamless switching between operation modes.

Figure 7:
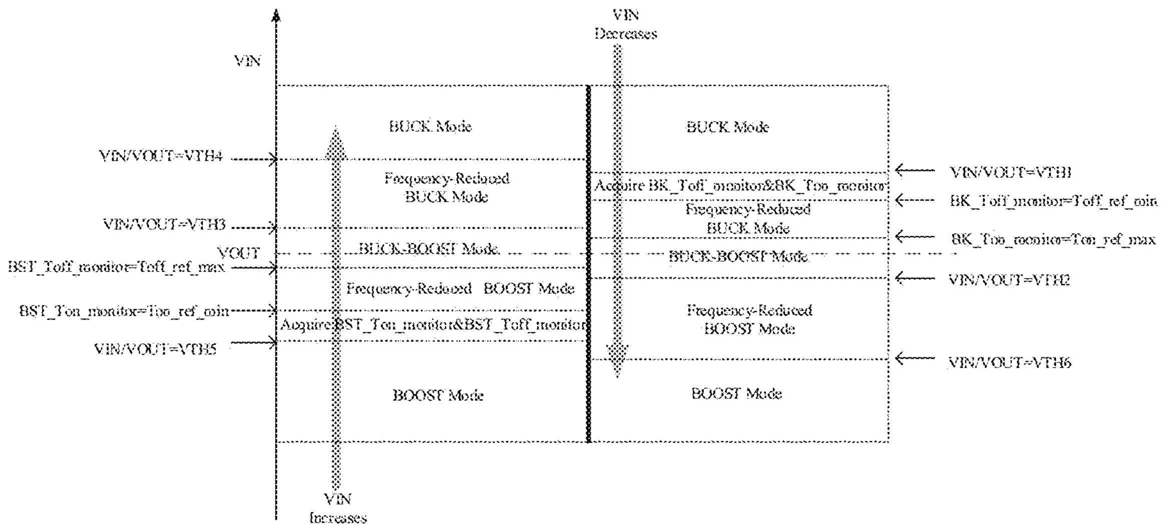
FIG. 7 is a schematic diagram of mode switching of the BUCK-BOOST switching power converter controlled by the controlling circuit, according to an embodiment of the present application.

One among several of the unique points of various embodiments of the present invention includes the exquisitely designed control schemes for operating the BUCK-BOOST switching power converter 100 to enter the BUCK-BOOST mode, while control schemes for operating the BUCK-BOOST switching power converter 100 to exit the BUCK-BOOST mode could be easily designed. Referring to FIG. 7, in one embodiment, controlling of the BUCK-BOOST switching power converter 100's exiting from the BUCK-BOOST mode can be realized based on processing the input voltage VIN and the output voltage VOUT. For example, when the ratio of the input voltage VIN to the output voltage VOUT is smaller than a second threshold value VTH2 (for example, VTH2=0.98), the BUCK-BOOST converter exits the BUCK-BOOST mode and operates in the frequency-reduced BOOST mode. When the ratio of the input voltage VIN to the output voltage VOUT is greater than a third threshold value VTH3 (for example, VTH3=1.03), the BUCK-BOOST converter exits the BUCK-BOOST mode and operates in the frequency-reduced BUCK mode. One among several of the unique points of various embodiments of the present invention includes the exquisitely designed control schemes for operating the BUCK-BOOST switching power converter 100 to enter the frequency-reduced BUCK mode, while control schemes for operating the BUCK-BOOST switching power converter 100 to exit the frequency-reduced BUCK mode could be easily designed. Referring to FIG. 7, in one embodiment, controlling of the BUCK-BOOST switching power converter 100's exiting from the frequency-reduced BUCK mode can be realized based on processing the input voltage VIN and the output voltage VOUT. For example, when the ratio of the input voltage VIN to the output voltage VOUT is greater than a fourth threshold value VTH4 (for example, VTH4=1.25), the BUCK-BOOST switching power converter 100 exits the frequency-reduced BUCK mode and operates in the BUCK mode.

On the other hand, the present application also discloses a scheme that the BUCK-BOOST switching power converter 100 needs to experience a transition mode when switching from the BOOST mode to the BUCK-BOOST mode. When the BUCK-BOOST switching power converter 100 operates in the BOOST mode, as the ratio of the input voltage VIN to the output voltage VOUT increases, the controlling circuit may be further configured to delay the BUCK-BOOST switching power converter 100 from entering the BUCK-BOOST mode as much as possible.

When the ratio of the input voltage VIN to the output voltage VOUT is smaller than the fifth threshold value VTH5 (for example, VTH5=0.9), the mode selection circuit 120 outputs a BST_mode signal in the first state (for example, logic high), indicating that the BUCK-BOOST switching power converter 100 operates in the BOOST mode.

The BST_mode signal in the first state (e.g., logic high) and a second pulse width modulation signal PWM_BST signal applicable for controlling the third power switch SWC and the fourth power switch SWD are logically operated, for controlling the switching unit to operate in the BOOST mode. Referring to FIG. 1, in one embodiment, the controlling circuit receives the output voltage feedback signal FB_VOUT, the reference voltage VREF, and a second sensing signal VISEN_BOOST that is indicative of a current flowing through the inductor in the BOOST mode, and provides the second pulse width modulation signal PWM_BST based on at least these received signals. The controlling circuit includes a second output regulating circuit 124, an off time controlling circuit 125, and a second logic circuit 126.

In one embodiment, the second logic circuit 126 is an RS flip-flop, and is configured to generate the second pulse width modulation signal PWM_BST. A set terminal of the second logic circuit 126 is coupled to an output terminal of the second output regulating circuit 124, and a reset terminal of the second logic circuit 126 is coupled to an output terminal of the off time controlling circuit 125.

Referring to FIG. 1, the second output regulating circuit 124 includes a comparison circuit 1241. The comparison circuit 1241 includes a first input terminal, a second input terminal and an output terminal, where the first input terminal is coupled to a second current sensing circuit 132 to receive a second sensing signal VISEN_BST that is indicative of the current flowing through the inductor in the BOOST mode, the second input terminal receives a second error amplification signal VEAO_BST, and the output terminal provides a second output regulating signal CMP_SET_BST. When the second sensing signal VISEN_BST increases to the second error amplification signal VEAO_BST, the second output regulating signal CMP_SET_BST jumps to the first state (e.g., logic high) to set the second logic circuit 126.

The off time controlling circuit 125 is configured to generate an off time controlling signal Toff_Done. The off time controlling signal Toff_Done in the first state (e.g., logic high) may reset the second logic circuit 126.

Figure 8:
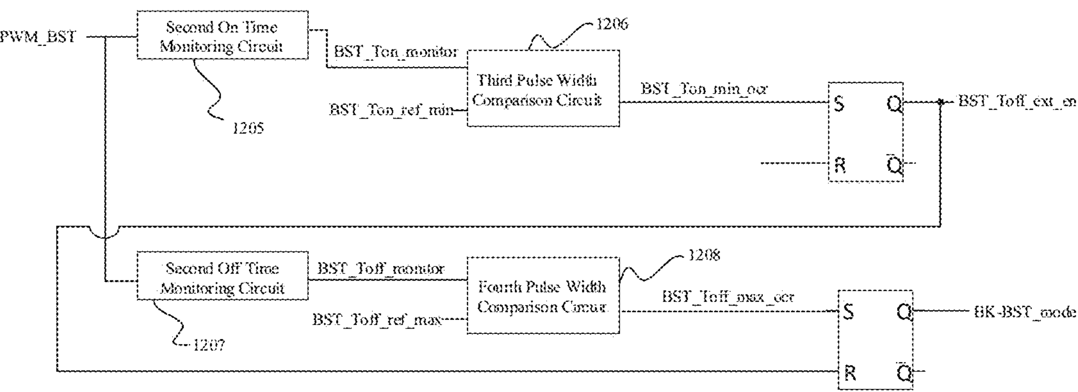
FIG. 8 is a schematic diagram of the mode selecting circuit, according to an embodiment of the present application.

When the ratio of the input voltage VIN to the output voltage VOUT gradually increases to VTH5, the controlling circuit is configured to acquire the key information carried in the second pulse width modulation signal PWM_BST in order to determine whether the current operation mode is still appropriate. Referring to FIG. 8, in one embodiment, the mode selection circuit 120 includes a second on time monitoring circuit 1205 and a third pulse width comparison circuit 1206. The second on time monitoring circuit 1205 samples the second pulse width modulation signal PWM_BST and generates a second on time monitoring signal BST_Ton_monitor that is indicative of an on time of the third power switch SWC. The third pulse width comparison circuit 1206 receives the second on time monitoring signal BST_Ton_monitor and compares it with a second on time threshold BST_Ton_ref_min. The second on time threshold BST_Ton_ref_min can be preset with reference to the minimum on time allowed in the BST mode. When the second on time monitoring signal BST_Ton_monitor decreases to the second on time threshold BST_Ton_ref_min, the third pulse width comparison circuit 1206 outputs a third indication signal BST_Ton_min_ocr in the first state (e.g., logic high). In one embodiment, the third indication signal BST_Ton_min_ocr in the first state sets the RS flip-flop, so that the mode selection circuit 120 can output an off time extension signal BST_toff_ext_en in the first state (for example, logic high), and then the BUCK-BOOST switching power converter 100 can enter the frequency-reduced BOOST mode.

In one embodiment, the off time extension signal BST_toff_ext_en in the first state (e.g., logic high) needs to be logically operated with the second pulse width modulation signal PWM_BST which is applicable for controlling the third power switch SWC and the fourth power switch SWD, for controlling the switching unit to operate in the frequency-reduced BOOST mode. In another embodiment, although the off time extension signal BST_toff_ext_en in the first state (e.g., logic high) is generated, it is not utilized or involved in the mode selection. A BOOST mode enabling signal BST_mode which is still in the first state (e.g., logic high) is logically operated with the second pulse width modulation signal PWM_BST, for controlling the switching unit to operate in the frequency-reduced BOOST mode.

Figure 9:
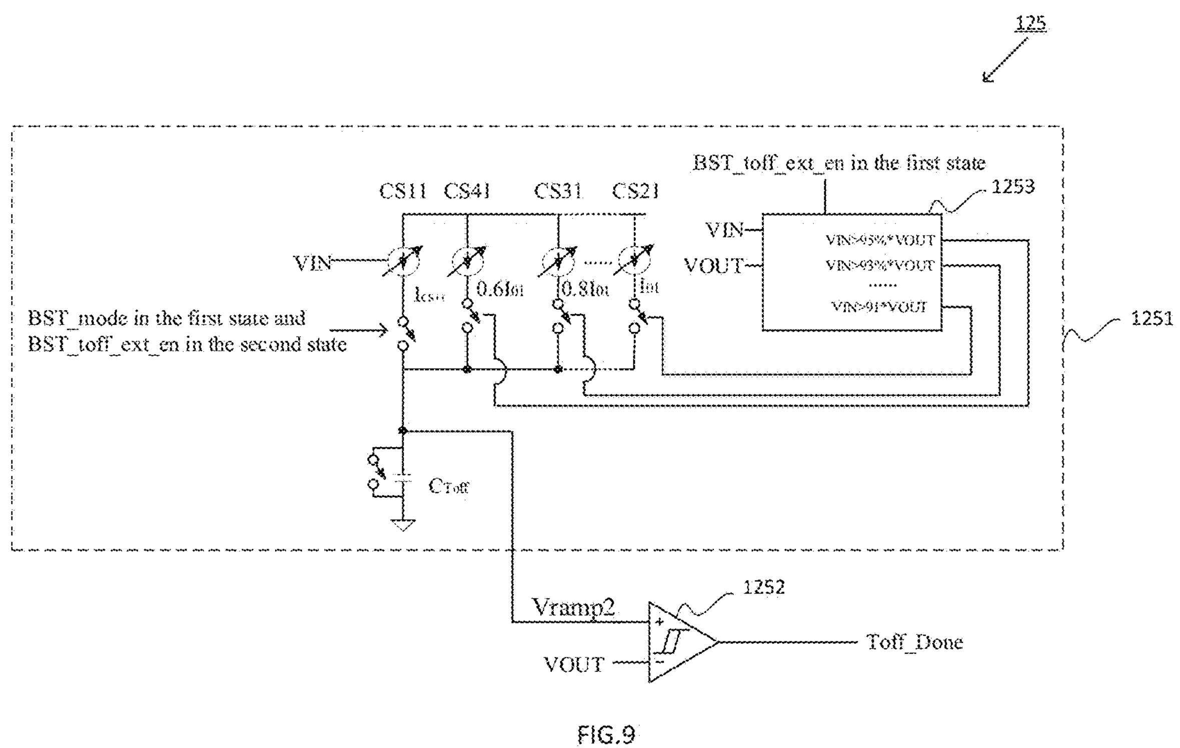
FIG. 9 is a schematic diagram of the off time controlling circuit, according to an embodiment of the present application.
Figure 10:
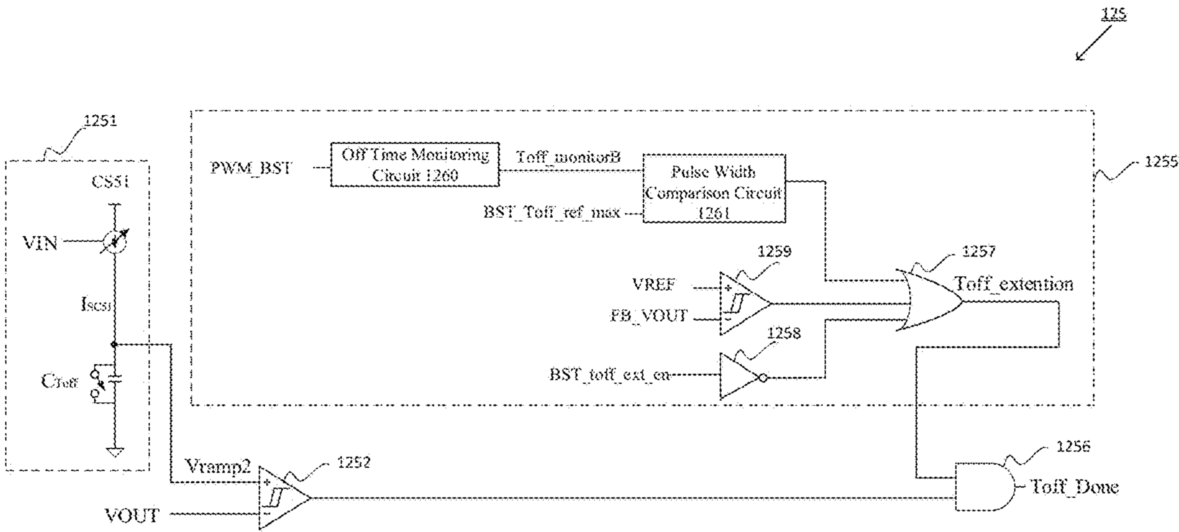
FIG. 10 is a schematic diagram of the off time controlling circuit, according to another embodiment of the present application.
Figure 11:
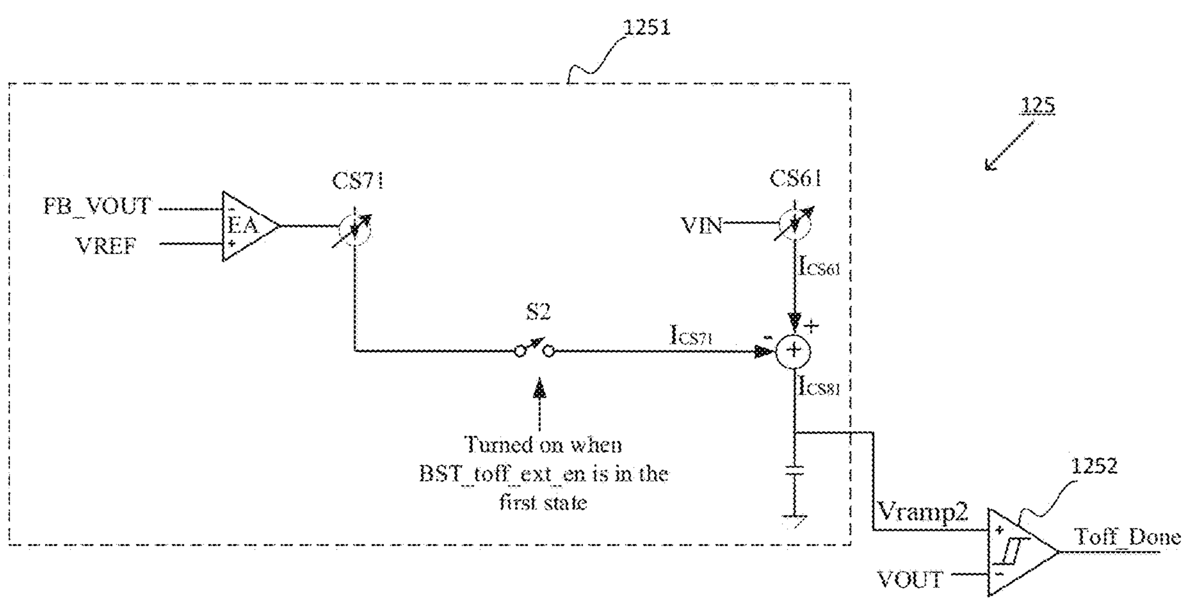
FIG. 11 is a schematic diagram of the off time controlling circuit, according to yet another embodiment of the present application.

In the present application, the mode selection does not rely on inputting the off time extension signal BST_toff_ext_en in the first state into the logic circuit 110 which then performs logical operation on it. The selection between the BOOST mode and the frequency-reduced BOOST mode can be realized by involving the off time extension signal BST_toff_ext_en in the first state in the process of generating the second pulse width modulation signal PWM_BST. When the off time extension signal BST_toff_ext_en is in the first state, the controlling circuit will generate the second pulse width modulation signal PWM_BST with a frequency-reduced BOOST mechanism, so that the off time of the third power switch SWC in the frequency-reduced BOOST mode is always longer than that of the third power switch SWC in the BOOST mode. FIGS. 9-11 provide some possible embodiments.

FIG. 9 is a schematic diagram of an off time controlling circuit 125, according to an embodiment of the present application. The off time controlling circuit 125 includes a ramp signal generating circuit 1251 and a comparison circuit 1252. The ramp signal generating circuit 1251 includes a plurality of current sources CS11, CS21, CS31, CS41 and a capacitor $C_{Toff}$. A voltage across the capacitor $C_{Toff}$ is used to provide a second ramp signal Vramp2. In one example, the plurality of current sources CS11, CS21, CS31 and CS41 are used to provide a plurality of charging currents correspondingly, and charging currents provided by different current sources have different magnitudes, such as $I_{CS11}$ and $I_{01}$ illustrated in FIG. 9. The off time extension signal BST_toff_ext_en and the BOOST mode enabling signal BST_mode will affect the selection of current sources. When the BOOST mode enabling signal BST_mode is in the first state (e.g., logic high) and the off time extension signal BST_toff_ext_en is in the second state (e.g., logic low), the current source CS11 controlled by the input voltage VIN generates a current $I_{CS11}$ and charges the capacitor $C_{Toff}$. When the off time extension signal BST_toff_ext_en is in the first state (e.g., logic high), a current source selection module 1253 continuously compares and calculates the input voltage VIN and the output voltage VOUT, and switches between the current sources CS21, CS31 and CS41 according to the comparison/calculation results. As the input voltage VIN approaches the output voltage VOUT gradually, $C_{Toff}$ is charged by a current source that provides a smaller charging current. For example, when the ratio of the input voltage VIN to the output voltage VOUT is greater than 91% but smaller than 93%, the current source CS21 is activated to provide the current $I_{01}$ to charge the capacitor $C_{Toff}$, when the ratio of the input voltage VIN to the output voltage VOUT is greater than 93% but smaller than 95%, the current source CS31 is activated to provide a current that is 0.8 times of the current $I_{01}$, and when the ratio of the input voltage VIN to the output voltage VOUT is greater than 95%, the current source CS41 is activated to provide a current that is 0.6 times of the current $I_{01}$. The current $I_{01}$ is smaller than the current $I_{CS11}$ generated by the current source CS11. The comparison circuit 1252 includes a first input terminal, a second input terminal and an output terminal, where the first input terminal is coupled to an output terminal of the ramp signal generating circuit 1251 to receive the second ramp signal Vramp2, the second input terminal receives the output voltage VOUT, and the output terminal provides the off time controlling signal Toff_done.

In this embodiment, the off time extension signal BST_toff_ext_en in the first state (e.g., logic high) can influence the generation of the second ramp signal Vramp2 in the off time controlling circuit 125. By directing one of the current sources CS21, CS31 and CS41 to charge the capacitor $C_{Toff}$, the second ramp signal Vramp2 ramps to the output voltage VOUT with a reduced slope, thereby extending a duration for the off time controlling signal Toff_Done to transit to the first state (for example, logic high), and thus providing an extended off time. With the increase of the ratio of the input voltage VIN to the output voltage VOUT, the off time gradually increases. As such, when the off time extension signal BST_toff_ext_en is in the first state (e.g., logic high), the controlling circuit generates the second pulse width modulation signal PWM_BST with the frequency-reduced BOOST mechanism, so that the BUCK-BOOST switching power converter 100 can operate in the frequency-reduced BOOST mode.

FIG. 10 is a schematic diagram of the off time controlling circuit 125, according to another embodiment of the present application. The off time controlling circuit 125 includes a ramp signal generating circuit 1251, a comparison circuit 1252, a delay circuit 1255 and a logical AND circuit 1256. The ramp signal generating circuit 1251 includes a circuit source CS51 controlled by the input voltage VIN, which provides a charging current $I_{CS51}$ to charge a capacitor $C_{Toff}$, and a voltage across the capacitor $C_{Toff}$ provides a second ramp signal Vramp2. The comparison circuit 1252 includes a first input terminal, a second input terminal and an output terminal, where the first input terminal is coupled to an output terminal of the ramp signal generating circuit 1251 to receive the second ramp signal Vramp2, and the second input terminal is coupled to the output voltage VOUT. When the second ramp signal Vramp2 is greater than the output voltage VOUT, a signal at an output terminal of the comparison circuit 1252 is inverted to the first state (e.g., logic high). The logical AND circuit 1256 includes a first input terminal, a second input terminal and an output terminal, where the first input terminal is coupled to the output terminal of the comparison circuit 1252, the second input terminal is coupled to an output terminal of the delay circuit 1255, and the output terminal provides the off time controlling signal Toff_Done. As shown in FIG. 10, in one embodiment, the delay circuit 1255 includes a logical OR circuit 1257, an inverter 1258 and a voltage comparator 1259. The inverter 1258 inverts the off time extension signal BK_ton_ext_en, and the voltage comparator 1259 compares the output voltage feedback signal FB_VOUT with the reference voltage VREF.

When the off time extension signal BST_toff_ext_en is in the second state (e.g., logic low), the delay circuit 1255 outputs the delay signal Toff_extention in the first state (e.g., logic high), and a generation timing of the off time controlling signal Toff_Done is determined by the output of the comparison circuit 1252. When the on time extension signal BST_toff_ext_en is in the first state (e.g., logic high), an output of the voltage comparator 1259 may affect the timing when the delay signal Toff_extention jumps to the first state. If the output voltage feedback signal FB_VOUT is greater than the reference voltage VREF, it means that there is too much energy currently provided, so it is necessary to extend the off time of the third power switch SWC, and the output signal of the voltage comparator 1259 maintains at the second state (e.g., logic low). Until the output voltage feedback signal FB_VOUT is smaller than the reference voltage VREF, indicating that the currently provided energy meets the demand, the third power switch SWC can be turned on, the output signal of the voltage comparator 1259 is inverted to the first state (e.g., logic high), and the delay circuit 1255 outputs the delay signal Toff_extention in the first state (e.g., logic high) to generate an effective off time controlling signal Toff_Done. In this embodiment, when the off time extension signal BST_toff_ext_en is in the first state, the timing for the off time controlling signal Toff_done to jump to the first state needs to be re-determined in combination with the feedback voltage. As long as the output energy is still too much, the off time will be extended. As such, when the off time extension signal BST_toff_ext_en is in the first state, the BUCK-BOOST switching power converter 100 operates in the frequency-reduced BOOST mode.

In some examples, the delay circuit 1255 further includes an off time monitoring circuit B and a pulse width comparison circuit B for controlling a maximum off time. The off time monitoring circuit B samples the second pulse width modulation signal PWM_BST and provides a time monitoring signal Ton_monitorB, and the pulse width comparison circuit B compares the time monitoring signal Ton_monitorB with a second off time threshold BST_Toff_ref_max. When the time monitoring signal Ton_monitorB indicating the off-time of the third power switch SWC increases to the second off time threshold BST_Toff_ref_max, the delay signal Ton_extention is inverted to the first state (e.g., logic high), so that the on time controlling signal Ton_Done is also inverted to the first state (e.g., logic high). In other examples, the output signal of a fourth pulse width comparison circuit 1208 shown in FIG. 8 can be input to the logical AND circuit 1256 to control the maximum off time.

FIG. 11 is another embodiment of the off time controlling circuit 125, according to an embodiment of the present application. The off time controlling circuit 125 includes a ramp signal generating circuit 1251 and a comparison circuit 1252. The ramp signal generating circuit 1251 includes a current source CS61 controlled by the input voltage VIN. The current $I_{CS61}$ provided by the current source CS61 changes in a same direction as the input voltage VIN, that is, it decreases as the input voltage VIN decreases and increases as the input voltage VIN increases. The ramp signal generating circuit 1251 further includes a current source CS71 controlled by an output voltage of an error amplifier EA. The current $I_{CS71}$ provided by the current source CS71 changes in an opposite direction with the output voltage of the error amplifier EA, that is, it increases as the output voltage of the error amplifier EA decreases and decreases as the output voltage of the error amplifier EA increases. Input terminals of the error amplifier EA receive the output voltage feedback signal FB_VOUT and the reference voltage VREF respectively. When the off time extension signal BST_toff_ext_en is in the second state (for example, logic low), the power switch SWC is not turned on, and the current $I_{CS61}$ is used to charge the capacitor $C_{Toff}$ (at this time, $I_{CS81}=C_{S61}$), and a voltage across the capacitor $C_{Toff}$ provides a second ramp signal Vramp2. When the off time extension signal BST_toff_ext_en is in the first state (for example, logic high), the power switch SWC is turned on, and a subtracter performs subtraction operation on the current $I_{CS61}$ and the current $I_{CS71}$, and then uses the subtracted current to charge the capacitor $C_{Toff}$ (at this time, $I_{CS81}=I_{CS61}-I_{CS71}$). The comparison circuit 1252 includes a first input terminal, a second input terminal and an output terminal, where the first input terminal is coupled to an output terminal of the ramp signal generating circuit 1251 to receive the second ramp signal Vramp2, and the second input terminal receives the output voltage VOUT. When the second ramp signal Vramp2 is greater than the output voltage VOUT, the comparison circuit 1252 outputs the off time controlling signal Toff_Done in the first state (e.g., logic high). In this embodiment, when the output energy is too much, the current source CS71 can provide the current $I_{CS71}$ which is linearly controlled, and the off time is extended accordingly. As such, when the off time extension signal BST_toff_ext_en is in the first state, the BUCK-BOOST switching power converter 100 operates in the frequency-reduced BOOST mode.

Referring to FIG. 8, the mode selection circuit 120 further includes a second off time monitoring circuit 1207 and the fourth pulse width comparison circuit 1208. The fourth pulse width comparison circuit 1208 receives the second off time monitoring signal BST_Toff_monitor which is provided by the second off time monitoring circuit 1207 and is indicative of the off time of the third power switch SWC, and then compares it with the second off time threshold BST_Toff_ref_max. In the foregoing exemplary embodiment, in the frequency-reduced BOOST mode, as the ratio of the input voltage VIN to the output voltage continues to increase, the off time will increase. When the second off time monitoring signal BST_Toff_monitor indicating the off time increases to the second off time threshold BST_Toff_ref_max, the fourth pulse width comparison circuit 1208 outputs a fourth indication signal BST_Toff_max_ocr in the first state (e.g., logic high). In one embodiment, the fourth indication signal BST_Toff_max_ocr in the first state can set the RS flip-flop, so that the mode selection circuit 120 can output the BK-BST_mode signal in the first state (e.g., logic high), and then control the BUCK-BOOST switching power converter 100 to exit the frequency-reduced BOOST mode and operate in the BUCK-BOOST mode.

From the above disclosure, it can be seen that in the control method of the present application, with the increase of the ratio of the input voltage VIN to the output voltage VOUT, the controlling circuit is configured to delay the time when the switching unit enters the BUCK-BOOST mode as much as possible. The information (for example, on time) carried in the second pulse width modulation signal PWM_BST is used to determine whether the current operation mode of the switching unit is appropriate. The frequency-reduced BOOST mode is still a BOOST mode in essence, but compared with the BOOST mode described in the present application, it has a longer off time and a lower frequency. The start condition of the frequency-reduced BOOST mode is that the second on time monitoring signal BST_Ton_monitor reaches the second on time threshold BK_Ton_ref_min, and the end condition of the frequency-reduced BOOST mode is that the second off time monitoring signal BST_Toff_monitor indicating the off time of the third power switch SWC increases to the second off time threshold BST_Toff_ref_max (that is, the preset maximum off time). In one embodiment, the mode switching may be performed when the time monitoring signals reach their corresponding thresholds for the first time, and in other embodiments, the mode switching may be performed when the time monitoring signals reach their corresponding thresholds for many times.

The condition of entering BUCK-BOOST mode is that the off time of the third power switch SWC has reached the preset maximum off time. When the above condition is met, if the BUCK-BOOST switching power converter 100 continues to operate in the reduced-frequency BOOST mode, it will provide excessive energy at the output terminal, so it is appropriate for the BUCK-BOOST switching power converter 100 to operate in the BUCK-BOOST mode.

Figure 12A:
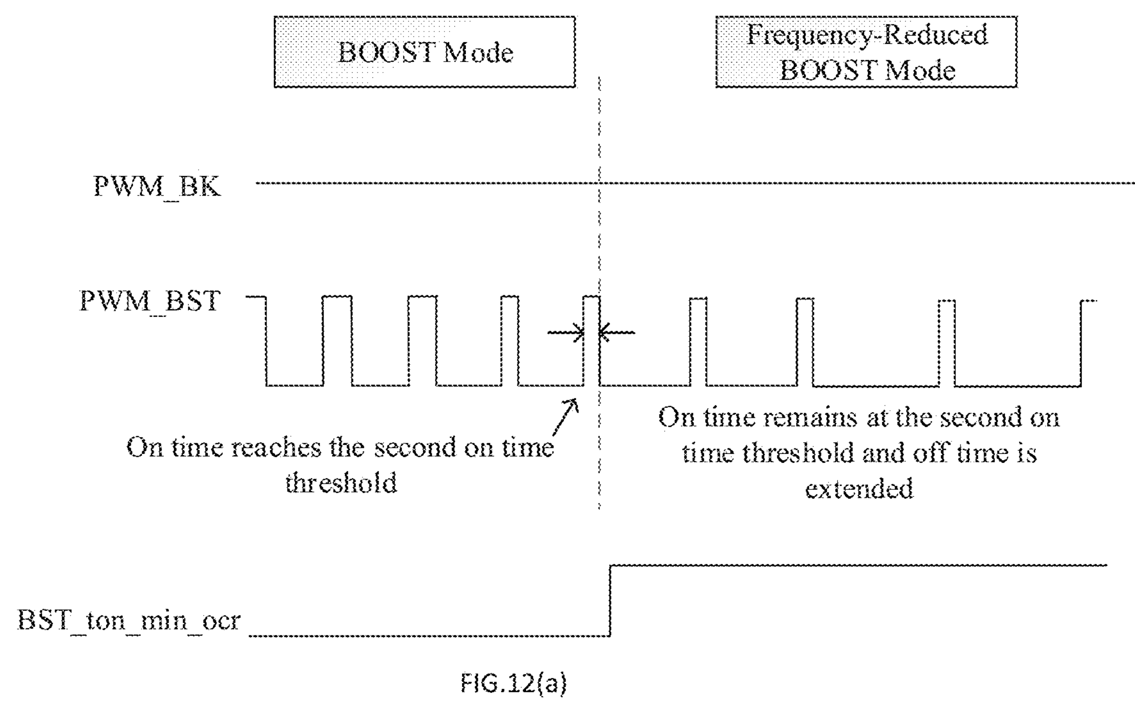
FIG. 12(*a*) and FIG. 12(*b*) are waveform diagrams of some signals in a BUCK-BOOST switching power converter in different modes controlled by a controlling circuit, according to an embodiment of the present application.
Figure 12B:
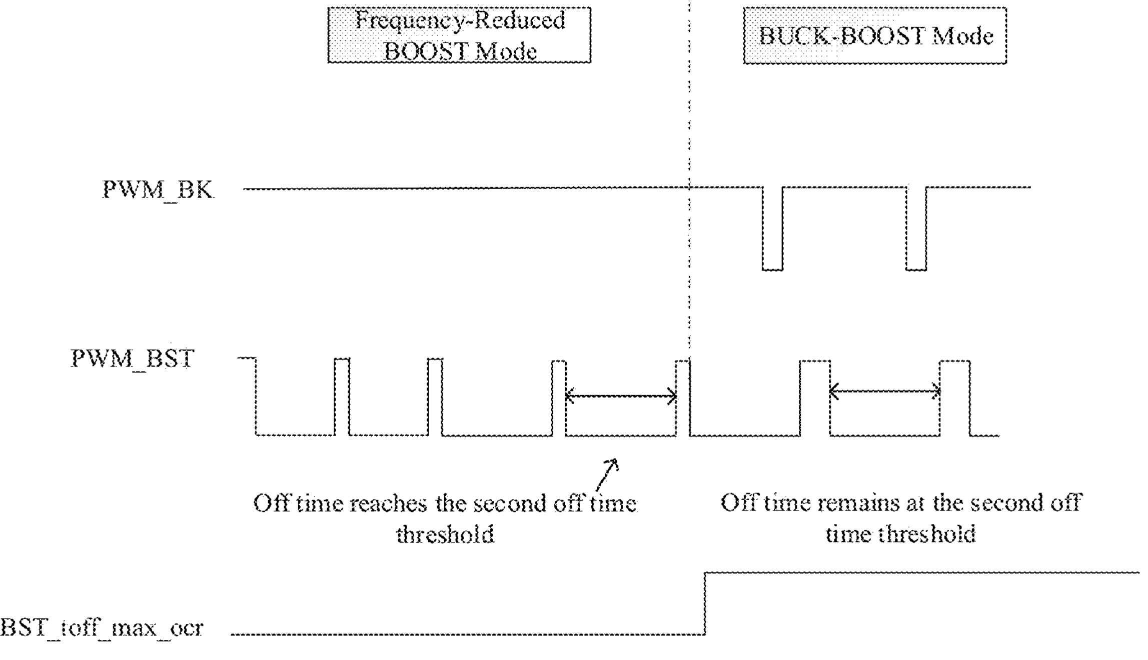

FIG. 12(*a*) and FIG. 12(*b*) are schematic waveform diagrams of some signals in the BUCK-BOOST switching power converter 100 operating in different modes. As shown in FIG. 12(*a*), at a critical point before entering the frequency-reduced BOOST mode, the on time of the second pulse width modulation signal PWM_BST has reached the second on time threshold BST_Ton_ref_min, and the third indication signal BST_Ton_min_ocr is inverted to the first state (e.g., logic high). After entering the frequency-reduced BOOST mode, the on time of the second pulse width modulation signal PWM_BST remains at the second on time threshold BST_Ton_ref_min, and the off time is extended. As shown in FIG. 12(*b*), at a critical point before entering the BUCK-BOOST mode, the off time of the second pulse width modulation signal PWM_BST has reached the second off time threshold BST_Toff_ref_max, and the fourth indication signal BST_Toff_max_ocr is inverted to the first state (e.g., logic high). In one embodiment of the present application, after entering the BUCK-BOOST mode, the off time of the second pulse width modulation signal PWM_BST is maintained at the second off time threshold BST_Toff_ref_max. As such, when the BUCK-BOOST switching power converter 100 is switched from the frequency-reduced BOOST mode to the BUCK-BOOST mode, the off time of the third power switch SWC remains unchanged, and the change of the switching frequency of the third power switch SWC is effectively controlled. In this way, the BUCK-BOOST switching power converter 100 described in the present application realizes seamless switching between operation modes.

The control method of the present application designs unique conditions for entering the BUCK-BOOST mode, and the conditions for exiting the BUCK-BOOST mode can be simply designed. Referring to FIG. 7, in one embodiment, the input voltage VIN is compared with the output voltage VOUT, and when the ratio of the input voltage VIN to the output voltage VOUT is smaller than the second threshold value VTH2 (for example, VTH2=0.98), the BUCK-BOOST converter exits the BUCK-BOOST mode and operates in the frequency-reduced BOOST mode. When the ratio of the input voltage VIN to the output voltage VOUT is greater than the third threshold value VTH3 (for example, VTH3=1.03), the BUCK-BOOST converter exits the BUCK-BOOST mode and operates in the frequency-reduced BUCK mode. In the control method of the present application, unique conditions for entering the frequency-reduced BOOST mode are designed, and conditions for exiting the frequency-reduced BOOST mode can be simply designed. Referring to FIG. 7, in one embodiment, the input voltage VIN is compared with the output voltage VOUT, and when the ratio of the input voltage VIN to the output voltage VOUT is smaller than a sixth threshold value VTH6 (for example, VTH6=0.85), the BUCK-BOOST converter exits the frequency-reduced BOOST mode and operates in the BOOST mode.

As shown in FIG. 7, the mode switching of the present application does not depend entirely on the variation of the ratio of the input voltage VIN to the output voltage VOUT. In one embodiment, the threshold values VTH1-VTH6 of the ratio of a plurality of input voltages VIN to output voltages VOUT have relative magnitudes as follows: the fourth threshold value VTH4>the first threshold value VTH1>the third threshold value VTH3>the second threshold value VTH2>the fifth threshold value VTH5>the sixth threshold value VTH6.

Under the control of the controller described in the present application, compared with the typical four-switch BUCK-BOOST converter, the BUCK-BOOST converter according to the present application further includes the frequency-reduced BUCK mode and the frequency-reduced BOOST mode. The BUCK-BOOST converter can operate in the BUCK-BOOST mode as little as possible the BUCK-BOOST mode by delaying the time the BUCK-BOOST converter enters the BUCK-BOOST mode. The BUCK-BOOST converter can operate in the frequency-reduced BUCK mode as long as the frequency-reduced BUCK mode can meet the requirements, and operates in the frequency-reduced BOOST mode as long as the frequency-reduced BOOST mode can meet the requirements. The BUCK-BOOST converter does not enter the BUCK-BOOST mode until the above conditions are met. Through such control method, the operating duration for the BUCK-BOOST switching power converter 100 to operate in the BUCK-BOOST mode can be shortened, which is helpful to reduce the loss and improve the efficiency.

While some embodiments of the present invention have been described in detail above, it should be understood, of course, these embodiments are for exemplary illustration only and are not intended to limit the scope of the present invention. Various modifications are contemplated, and they obviously will be resorted to by those skilled in the art without departing from the spirit and the scope of the invention.

What I claimed is:

1. A controller for a BUCK-BOOST converter for converting an input voltage into an output voltage, comprising:

a mode selection circuit, configured to compare a first off time monitoring signal that is indicative of an off time of a first power switch with a first off time threshold, and further configured to compare a first on time monitoring signal that is indicative of an on time of the first power switch with a first on time threshold;

wherein the controller is configured to control the BUCK-BOOST converter to operate in a frequency-reduced BUCK mode when the first off time monitoring signal reaches the first off time threshold; and is further configured to control the BUCK-BOOST converter to operate in a BUCK-BOOST mode when the first on time monitoring signal reaches the first on time threshold; wherein when the controller for the BUCK-BOOST converter operates in the frequency-reduced BUCK mode, the controller is configured to control the on time of the first power switch to be always longer than that in a BUCK mode; wherein when the first off time monitoring signal reaches the first off time threshold, the mode selection circuit is configured to output an on time extension signal having a first extension state; wherein when the first on time monitoring signal reaches the first on time threshold, the mode selection circuit is further configured to output a BUCK-BOOST mode enabling signal having a first enabling state; and wherein the on time extension signal is configured to extend a time duration.

2. The controller for the BUCK-BOOST converter according to claim 1, further comprising:

an on time controlling circuit configured to receive the input voltage, the output voltage and the on time extension signal, and further configured to generate an on time controlling signal having a first control state, so as to turn off the first power switch and turn on a second power switch.

3. The controller for the BUCK-BOOST converter according to claim 2, wherein when the on time extension signal is in the first extension state, the on time controlling circuit is further configured to extend a time that is needed for generating the on time controlling signal having the first control state.

4. The controller for the BUCK-BOOST converter according to claim 2, further comprising:

a first error amplification circuit, comprising a first input terminal, a second input terminal and an output terminal, wherein the first input terminal receives a reference signal, and the second input terminal receives a feedback signal that is indicative of the output voltage, and the first error amplification circuit is configured to generate a first error amplification signal based on the reference signal and the feedback signal;

a first comparison circuit, comprising a first input terminal, a second input terminal and an output terminal, wherein the first input terminal receives the first error amplification signal, and the second input terminal receives a first current sampling signal that is indicative of a current flowing through an inductor, the first comparison circuit is configured to compare the first current sampling signal with the first error amplification signal, and when the first current sampling signal is decreased to be less than the first error amplification signal, the first comparison circuit is configured to generate a first output regulating signal in a first regulation state, so as to turn on the first power switch and turn off the second power switch.

5. The controller for the BUCK-BOOST converter according to claim 2, wherein the on time controlling circuit comprises a ramp signal generating circuit and a voltage comparison circuit, wherein the ramp signal generating circuit comprises a first current source, a second circuit source, a third current source and a capacitor, wherein the first current source is configured to provide a first charging current, the second current source is configured to provide a second charging current, and the third current source is configured to provide a third charging current; and wherein the on time controlling circuit is configured to select one of the first current source, the second circuit source and the third current source to charge the capacitor based on the on time extension signal and a BUCK mode enabling signal.

6. The controller for the BUCK-BOOST converter according to claim 5, wherein the first charging current is greater than the second charging current and the second charging current is greater than the third charging current.

7. The controller for the BUCK-BOOST converter according to claim 2, wherein the on time controlling circuit comprises a ramp signal generating circuit, a voltage comparison circuit, a delay circuit and a logical AND circuit, wherein, the ramp signal generating circuit comprises a current source and a capacitor, wherein the current source is configured to provide a charging current to charge the capacitor, and a voltage across the capacitor provides a ramp signal;

the voltage comparison circuit is configured to provide a comparison result of comparing the ramp signal and the output voltage at its output terminal;

the delay circuit is configured to provide a delay signal at its output terminal;

the logical AND circuit comprise a first input terminal, a second input terminal and an output terminal, wherein the first input terminal is coupled to the output terminal of the voltage comparison circuit, the second input terminal is coupled to the output terminal of the delay circuit, and the output terminal provides the on time controlling signal.

8. The controller for the BUCK-BOOST converter according to claim 7, wherein the delay circuit comprises a logical OR circuit, an inverter and a voltage comparator, wherein, the inverter is configured to provide an inverted on time extension signal at its output terminal;

the voltage comparator is configured to provide a comparison result of comparing a feedback signal and a reference signal at its output terminal;

the logical OR circuit has a first input terminal, a second input terminal and an output terminal, wherein the first input terminal is coupled to the output terminal of the inverter, the second input terminal is coupled to the output terminal of the voltage comparator, and the output terminal provides the delay signal.

9. The controller for the BUCK-BOOST converter according to claim 2, wherein the on time controlling circuit comprises a ramp signal generating circuit and a voltage comparison circuit, wherein, the ramp signal generating circuit comprises a fourth current source, a fifth current source, a subtracter, a switch, an error amplifier and a capacitor, wherein a voltage across the capacitor is used for providing a ramp signal;

the voltage comparison circuit is configured to receive the ramp signal and the output voltage at its input terminals respectively, and provide the on time controlling signal at its output terminal according to the comparison result of comparing the ramp signal and the output voltage.

10. The controller for the BUCK-BOOST converter according to claim 9, wherein, the error amplifier is configured to receive an output voltage feedback signal and a reference voltage the at its input terminals respectively;

the fifth current source is controlled by an output voltage of the error amplifier to provide a fifth current, and the fifth current changes in a same direction with the output voltage of the error amplifier;

the fourth current source is controlled by the input voltage to provide a fourth current, and the fourth current changes in a same direction with the input voltage;

the switch is controlled by the on time extension signal, wherein when the switch is turned off, the fourth current is used to charge the capacitor, and when the switch is turned on, a difference between the fourth current and the fifth current is used to charge the capacitor.

11. The controller for the BUCK-BOOST converter according to claim 1, wherein the first off time threshold is a preset minimum off time of the first power switch allowed in a BUCK mode.

12. The controller for the BUCK-BOOST converter according to claim 11, wherein when the controller for the BUCK-BOOST converter operates in the frequency-reduced BUCK mode, the controller is configured to control the off time of the first power switch to be always equal to the preset minimum off time of the first power switch, and further configured to control the on time of the first power switch to increase as a ratio of the input voltage to the output voltage decreases.

13. The controller for the BUCK-BOOST converter according to claim 1, wherein the first on time threshold is a preset maximum on time of the first power switch.

14. The controller for the BUCK-BOOST converter according to claim 13, wherein when the controller controls the BUCK-BOOST converter to operate in the BUCK-BOOST mode, the controller is configured to control the on time of the first power switch to be always equal to the preset maximum on time of the first power switch.

15. The controller for the BUCK-BOOST converter according to claim 1, wherein the mode selection circuit comprises a first off time monitoring circuit and a first pulse width comparison circuit, wherein the first off time monitoring circuit is configured to sample the off time of the first power switch and generate the first off time monitoring signal, and the first pulse width comparison circuit is configured to receive the first off time monitoring signal and compare it with the first off time threshold; wherein the mode selection circuit further comprises a first on time monitoring circuit and a second pulse width comparison circuit, wherein the first on time monitoring circuit is configured to sample the on time of the first power switch and generate the first on time monitoring signal, and the second pulse width comparison circuit is configured to receive the first on time monitoring signal and compare it with the first on time threshold.

16. A controller for a BUCK-BOOST converter for converting an input voltage into an output voltage, comprising:

a mode selection circuit, configured to compare a second on time monitoring signal that is indicative of an on time of a third power switch with a second on time threshold, and further configured to compare a second off time monitoring signal that is indicative of an off time of the third power switch with a second off time threshold; wherein the controller is configured to control the BUCK-BOOST converter to operate in a frequency-reduced BOOST mode when the second on time monitoring signal reaches the second on time threshold, and is further configured to control the BUCK-BOOST converter to operate in a BUCK-BOOST mode when the second off time monitoring signal reaches the second off time threshold; wherein when the controller for the BUCK-BOOST converter operates in the frequency-reduced BOOST mode, the controller for the BUCK-BOOST converter is configured to control the off time of the third power switch to be always longer than that in a BOOST mode; wherein when the second on time monitoring signal reaches the second on time threshold, the mode selection circuit is configured to output an off time extension signal having a first selection state; wherein when the second off time monitoring signal reaches the second off time threshold, the mode selection circuit is further configured to output a BUCK-BOOST mode enabling signal having a first enabling state; and wherein the off time extension signal is configured to extend a time duration.

17. The controller for the BUCK-BOOST converter according to claim 16, further comprising an off time controlling circuit, configured to receive the input voltage, the output voltage and the off time extension signal at its input terminals respectively, and further configured to generate an off time controlling signal having a first control state at its output terminal, so as to turn on the third power switch and turn off a fourth power switch.

18. The controller for the BUCK-BOOST converter according to claim 17, wherein when the off time extension signal is in the first state, the off time controlling circuit is further configured to extend a time that is needed for generating the off time controlling signal having the first control state.

19. The controller for the BUCK-BOOST converter according to claim 17, further comprising:

a second error amplification circuit, comprising a first input terminal, a second input terminal and an output terminal, wherein the first input terminal is configured to receives a reference signal and the second input terminal is configured to receive a feedback signal that is indicative of the output voltage, and the second error amplification circuit is configured to generate a second error amplification signal based on the reference signal and the feedback signal;

a second comparison circuit, comprising a first input terminal, a second input terminal and an output terminal, wherein the first input terminal is configured to receive the second error amplification signal, the second input terminal is configured to receive a second current sampling signal that is indicative of a current flowing through an inductor, and wherein the second comparison circuit is configured to compare the second current sampling signal with the second error amplification signal, and when the second current sampling signal is increased to the second error amplification signal, the second comparison circuit is configured to generate a second output regulating signal in a first regulation state at the output terminal, so as to turn off the third power switch and turn on the fourth power switch.

20. The controller for the BUCK-BOOST converter according to claim 17, wherein the off time controlling circuit comprises a ramp signal generating circuit and a voltage comparison circuit, wherein the ramp signal generating circuit comprises a first current source, a second circuit source, a third current source and a capacitor, wherein the first current source is configured to provide a first charging current, the second current source is configured to provide a second charging current, and the third current source is configured to provide a third charging current; and wherein the off time controlling circuit is configured to select one of the first current source, the second circuit source and the third current source to charge the capacitor based on the off time extension signal and a BOOST mode enabling signal.

21. The controller for the BUCK-BOOST converter according to claim 20, wherein the first charging current is greater than the second charging current and the second charging current is greater than the third charging current.

22. The controller for the BUCK-BOOST converter according to claim 17, wherein the on time controlling circuit comprises a ramp signal generating circuit, a voltage comparison circuit, a delay circuit and a logical AND circuit, wherein, the ramp signal generating circuit comprises a current source and a capacitor, wherein the current source is configured to provide a charging current to charge the capacitor, and a voltage across the capacitor provides a ramp signal;

the voltage comparison circuit is configured to provide a comparison result of comparing the ramp signal and the output voltage at its output terminal;

the delay circuit is configured to provide a delay signal at its output terminal; and the logical AND circuit comprises a first input terminal, a second input terminal and an output terminal, wherein the first input terminal is coupled to the output terminal of the voltage comparison circuit, the second input terminal is coupled to the output terminal of the delay circuit, and the output terminal provides the off time controlling signal.

23. The controller for the BUCK-BOOST converter according to claim 22, wherein the delay circuit comprises a logical OR circuit, an inverter and a voltage comparator, wherein, the inverter is configured to provide an inverted off time extension signal at its output terminal;

the voltage comparator is configured to provide a comparison result of comparing a feedback signal and the reference signal at its output terminal;

the logical OR circuit is configured to comprise a first input terminal, a second input terminal and an output terminal, wherein the first input terminal is coupled to the output terminal of the inverter, the second input terminal is coupled to the output terminal of the voltage comparator, and the output terminal provides the delay signal.

24. The controller for the BUCK-BOOST converter according to claim 17, wherein the off time controlling circuit comprises a ramp signal generating circuit and a voltage comparison circuit, wherein, the ramp signal generating circuit comprises a fourth current source, a fifth current source, a subtracter, a switch, an error amplifier and a capacitor, wherein a voltage across the capacitor is used for providing a ramp signal;

the voltage comparison circuit is configured to receive the ramp signal and the output voltage at its input terminals respectively, and the voltage comparison circuit is configured to provide the off time controlling signal at its output terminal according to a comparison result of comparing the ramp signal and the output voltage.

25. The controller for the BUCK-BOOST converter according to claim 24, wherein, the error amplifier is configured to receive an output voltage feedback signal and a reference voltage at its input terminals respectively;

the fifth current source is controlled by an output voltage of the error amplifier to provide a fifth current, and the fifth current changes in an opposite direction with the output voltage of the error amplifier;

the fourth current source is controlled by the input voltage to provide a fourth current, and the fourth current changes in a same direction with the input voltage;

the switch is controlled by the off time extension signal;

when the switch is turned off, the fourth current is used to charge the capacitor, and when the switch is turned on, a difference between the fourth current and the fifth current is used to charge the capacitor.

26. The controller for the BUCK-BOOST converter according to claim 16, wherein the second on time threshold is a preset minimum on time of the third power switch allowed in a BOOST mode.

27. The controller for the BUCK-BOOST converter according to claim 26, wherein when the controller for the BUCK-BOOST converter operates in the frequency-reduced BOOST mode, the controller is configured to control the on time of the third power switch to be always equal to the preset minimum on time of the third power switch, and further configured to control the off time of the third power switch to increase as a ratio of the input voltage to the output voltage increases.

28. The controller for the BUCK-BOOST converter according to claim 16, wherein the second off time threshold is a preset maximum off time of the third power switch.

29. The controller for the BUCK-BOOST converter according to claim 28, wherein when the controller controls the BUCK-BOOST converter to operate in the BUCK-BOOST mode, the controller for the BUCK-BOOST converter is configured to control the off time of the third power switch to be always equal to the preset maximum off time of the third power switch.

30. The BUCK-BOOST converter controller according to claim 16, wherein the mode selection circuit comprises a second on time monitoring circuit and a third pulse width comparison circuit, wherein the second on time monitoring circuit is configured to sample the on time of the third power switch and generate the second on time monitoring signal, and the third pulse width comparison circuit is configured to receive the second on time monitoring signal and compare it with the second on time threshold; wherein the mode selection circuit further comprises a second off time monitoring circuit and a fourth pulse width comparison circuit, wherein the second off time monitoring circuit is configured to sample the off time of the third power switch and generate the second off time monitoring signal, and the fourth pulse width comparison circuit is configured to receive the second off time monitoring signal and compare it with the second off time threshold.

* * * * *